(12) United States Patent
Chauvin et al.

(10) Patent No.: US 9,079,345 B2
(45) Date of Patent: Jul. 14, 2015

(54) METHOD AND APPARATUS FOR PACKAGING A LIQUID FOOD PRODUCT

(75) Inventors: Guillaume Chauvin, Monthureux sur Saone (FR); Fabio Chimetto, Piazzola sul Brenta (IT); Klaus Hartwig, Nancy (FR); Angelo Di Lucchio, Fishers, IN (US)

(73) Assignee: Discma AG, Hunenberg (CH)

( * ) Notice: Subject to any disclaimer, the term of this patent is extended or adjusted under 35 U.S.C. 154(b) by 226 days.

(21) Appl. No.: 13/001,985

(22) PCT Filed: Jul. 2, 2009

(86) PCT No.: PCT/EP2009/058307
§ 371 (c)(1),
(2), (4) Date: Apr. 4, 2011

(87) PCT Pub. No.: WO2010/003873
PCT Pub. Date: Jan. 14, 2010

(65) Prior Publication Data
US 2011/0285063 A1 Nov. 24, 2011

(30) Foreign Application Priority Data
Jul. 7, 2008 (EP) .................................. 08159856

(51) Int. Cl.
*B29C 49/46* (2006.01)
*B29C 49/06* (2006.01)
*B29C 49/12* (2006.01)
(Continued)

(52) U.S. Cl.
CPC .............. *B29C 49/46* (2013.01); *B29C 49/06* (2013.01); *B29C 49/12* (2013.01); *B29C 2049/4655* (2013.01); *B29C 2049/4664* (2013.01); *B29K 2067/00* (2013.01); *B65B 3/022* (2013.01)

(58) Field of Classification Search
USPC ......................................................... 264/525
See application file for complete search history.

(56) References Cited

U.S. PATENT DOCUMENTS 3,712,784 A * 1/1973 Siard et al. .................... 425/526
6,692,684 B1 * 2/2004 Nantin et al. ................. 264/521
7,473,388 B2   1/2009 Desanaux et al.
(Continued)

FOREIGN PATENT DOCUMENTS

EP   1529620   5/2005
FR   1430316   3/1966
(Continued)

OTHER PUBLICATIONS

PCT International Search Report for Application No. PCT/EP2009/058387—Mailing Date of Sep. 11, 2009, 5 pages.

*Primary Examiner* — Ryan Ochylski
(74) *Attorney, Agent, or Firm* — Honigman Miller Schwartz & Cohn LLP; Eric J. Sosenko; Jonathan P. O'Brien

(57) ABSTRACT

The invention relates to a method of and a device for delivering a predetermined volume of beverage into a thermoplastic container formed from a preform positioned in a mold having an opening opposite an injection head (18), characterized in that the method includes a prior step of exposing the preform to a sterilizing fluid supplied by a first circuit connected to the injection head (18) and a step of injecting, into a recess of the preform, at least some of the beverage supplied by a second circuit connected to the injection head (18) so as to promote expansion of the preform inside the mold, the mold defining the shape of the container.

22 Claims, 4 Drawing Sheets

(51) Int. Cl.
  *B29K 67/00* (2006.01)
  *B65B 3/02* (2006.01)

(56) References Cited

U.S. PATENT DOCUMENTS

| | | | |
|---|---|---|---|
| 7,806,680 B2 | 10/2010 | Adriansens et al. | |
| 2003/0000969 A1* | 1/2003 | Mie | 222/196 |
| 2004/0141886 A1* | 7/2004 | Py et al. | 422/102 |
| 2005/0260096 A1* | 11/2005 | Voyten et al. | 422/21 |
| 2008/0164642 A1* | 7/2008 | Hirdina | 264/528 |
| 2008/0254160 A1* | 10/2008 | Rousseau et al. | 425/535 |
| 2011/0300249 A1* | 12/2011 | Andison et al. | 425/149 |

FOREIGN PATENT DOCUMENTS

| | | |
|---|---|---|
| FR | 2839277 | 11/2003 |
| FR | 2887525 | 12/2006 |
| WO | 0242055 | 5/2002 |
| WO | WO2005044540 | 5/2005 |
| WO | WO 2005092594 A1 * | 10/2005 |
| WO | 2007120807 | 10/2007 |

* cited by examiner

METHOD AND APPARATUS FOR PACKAGING A LIQUID FOOD PRODUCT

The present invention relates to the field of manufacturing containers made of a polymer material, especially a polyester. More particularly, it relates to the field of manufacturing polyester bottles, preferably polyethylene terephthalate (PET) bottles containing a liquid, preferably water and especially mineral water.

For many years, the PET bottles usually found on the market have been manufactured by the blow moulding or stretch-blow moulding of PET preforms using compressed air.

A preform usually takes the form of a cylindrical tube closed at one of its ends and open at its opposite end. The open head of the preform corresponds to the neck of the container. During the conventional process for manufacturing containers from preforms, the preforms are slipped onto the cylindrical mounts of a continuous conveyor chain, which thus transports the preforms through an oven, essentially formed by a straight section bordered on each side by radiative heating means, so as to temperature-condition the plastic for the subsequent stretch-blow moulding step.

The hot preform is then taken off and transported into a mould of a blow moulding machine. The transport movement, performed for example by a transfer arm, is coordinated with that of the blow moulding machine, which is generally produced in the form of a rotary carousel that rotates continuously about its vertical axis and carries, on its periphery, a series of identical moulds. Thus, the preform is placed in the mould immediately after it has been opened and the previously formed container has been removed.

The preform is heated beforehand so as to be in the mould at a temperature above the glass transition temperature (about 100° C.) so as to enable it to be formed by stretch-blow moulding. The temperature of the preform at the end of the heating step is slightly above that required inside the mould of the blow moulding machine, so as to take into account the cooling that takes place over the distance that exists between the heating site and the blow-moulding site. Thanks to the simultaneous presence of several moulds, such a blow moulding machine can produce containers at very high rates, of around several tens of thousands of units per hour, i.e. around 1000 to 2000 bottles per hour per mould.

The stretch-blow moulding takes place by stretching using a metal rod and by injecting air at pressures ranging from 3 to 40 bar ($3 \times 10^5$ Pa to $4 \times 10^6$ Pa). The air is injected through a nozzle, the end of which is introduced through the opening in the head of the preform.

As is known, the sterilization of food products and of their containers is an important subject, in particular according to the hygiene standards defined by the sanitary authorities. It turns out that establishing effective industrial processes making it possible, for low cost, to meet the standards, or even providing an additional benefit to the consumer in terms of long life of the food products, is a current challenge for manufacturers.

Within this context, the invention makes it possible to produce beverage bottles, of a high degree of sterility, in large quantity and for low cost.

For this purpose, the Applicant has developed a method of delivering a predetermined volume of a beverage into a thermoplastic container formed from a preform, which may be approximately cylindrical, the preform possibly being heated, and the preform also being positioned in a mould having an opening opposite an injection head, the method including a prior step of exposing the preform to a sterilizing fluid supplied by a first circuit connected to the injection head and a step of injecting, into a recess of the preform, at least some of the beverage supplied by a second circuit connected to the injection head so as to promote expansion of the preform inside the mould, the mould defining the shape of the container.

The method according to the invention allows efficient production of a volume of beverage delivered aseptically in a single integrated device, the filling operation being carried out in an exceptionally small aseptic zone.

According to a preferred feature, the exposure step comprises exposure to pressurized steam.

It is also possible for the exposure to comprise exposure to peracetic acid.

According to one embodiment, the exposure comprises exposure to hydrogen peroxide.

Preferably, the method further includes a step of irradiating the preform with sterilizing radiation.

This irradiating step may comprise irradiation of the preform with X-rays.

Alternatively, or optionally in combination, the irradiating step comprises irradiation of the preform with microwaves.

It is also possible for the irradiating step to comprise a step of irradiating with an electron beam or with pulsed light.

Preferably, the method further includes a prior step of exposing the filling head to the sterilizing fluid.

Advantageously, the method also includes a prior step of exposing, to the sterilizing fluid, a stretch rod used during the injection step for stretching the preform longitudinally.

According to one embodiment, a prior step of at least partly sterilizing the preform is carried out before the preform is introduced into the mould.

In particular, a first microbioreduction outside the mould and a second microbioreduction inside the mould are for example carried out. In both cases, this is to reduce the microbiological population by about 5 log.

Finally, the method advantageously further includes a step of removing debris from the mould after the preform has been expanded.

This step may be supplemented by cleaning the mould and the entire device, especially the nozzle. The debris in question may be small volumes of beverage or thermoplastic debris. This also makes it possible to look after the hygiene properties of the devices used.

According to one important feature of the invention, the first and second circuits are separate and distinct.

Finally, according to one aspect, said step of exposing the preform to a sterilizing fluid includes increasing the temperature of the preform. It is even advantageous for said increase in the temperature of the preform to be sufficient to promote expansion of the preform inside the mould during the injection step.

The Applicant's invention also relates to a device for delivering a predetermined volume of beverage into a thermoplastic container formed from a preform which may be approximately cylindrical, the preform being optionally heated, and the preform also being positioned in a mould having an opening opposite an injection head, the device including means for exposing the preform beforehand to a sterilizing fluid supplied by a first circuit connected to the injection head and means for injecting, into a recess of the preform, at least some of the beverage supplied by a second circuit connected to the injection head so as to promote expansion of the preform inside the mould, the mould defining the shape of the container.

Advantageously, this device may include means suitable for carrying out the respective intended steps of the method, taken separately or in combination.

The invention will now be described in detail with reference to the appended figures, which relate to exemplary embodiments.

The embodiment given here by way of example relates to a process for manufacturing PET mineral water bottles from a heated preform. The preform has the shape of a cylindrical tube closed at its lower end. The open head of the preform corresponds to the throat or neck of the bottle, onto which a closure cap is screwed.

The device includes a first circuit for the liquid to be bottled and a second circuit for a pressurized heated fluid capable of sterilizing the filling head.

Figure 1:
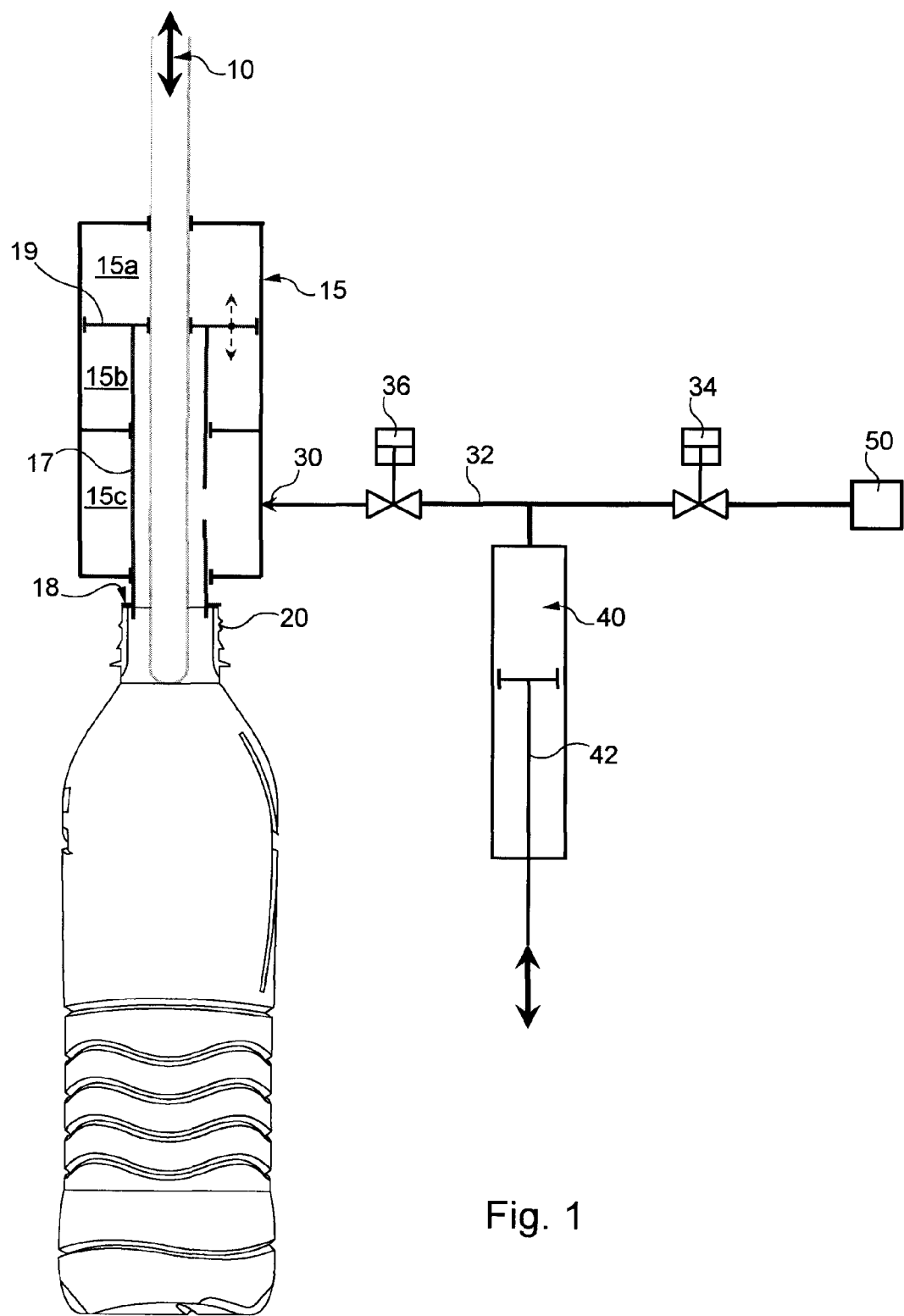
FIG. 1 shows a functional diagram of a beverage delivery device to which the invention applies.

Referring to FIG. 1, a stretch rod 10 is inserted into a compressed-air actuator 15. The stretch rod 10 is generally controlled by an air actuator associated with a cam, which gives it a longitudinal movement (represented by an arrow). It is also possible to use a stretch motor.

The compressed-air actuator 15 comprises a cylinder 17 controlling an injection head 18, through which the stretch rod 10 passes. The injection head 18 is connected to the neck 20 of a PET preform placed in a mould (not shown), which preform, after being expanded, takes on the shape of a mineral water bottle, this shape being determined by the wall of the mould.

The actuator comprises three chambers, the upper two chambers 15a and 15b being filled with compressed air. Between these upper two chambers, a piston wall 19 slides in a direction parallel to the stretch rod (the displacement being represented by an arrow). The stretch rod 10 passes through the centre of this wall 19.

The compressed-air actuator also includes a lateral inlet 30 for the beverage, here mineral water, connected to the third chamber 15c of the actuator, this being the bottom chamber. The beverage is fed in via a line 32.

An external mineral water inlet feeds the liquid via the remote end of this line 32 into a first valve 34, which is connected to the opening of a single-chamber filling cylinder 40 comprising a piston 42 controlled by a filling motor (movement of which is represented by an arrow). This motor imparts a longitudinal movement on the piston in the single chamber of the filling cylinder 40.

On the line 32 there is a second valve 36, which is in series behind the first valve 34 and the opening of the filling cylinder 40. The line 32 then runs into the bottom chamber 15c of the compressed-air actuator 15.

The bottom chamber 15c of the compressed-air actuator is penetrated by the cylinder 17 for controlling the filling head 18, the internal volume of which emerges through the lower outlet of the compressed-air actuator 15 into the filling head 18. The control cylinder has a lateral opening allowing the beverage to circulate between the bottom chamber of the actuator and the inside of the control cylinder.

The stretch rod 10 itself passes through the control cylinder 17 as far as the filling head 18 and the neck 20 of the bottle preform.

Figure 2:
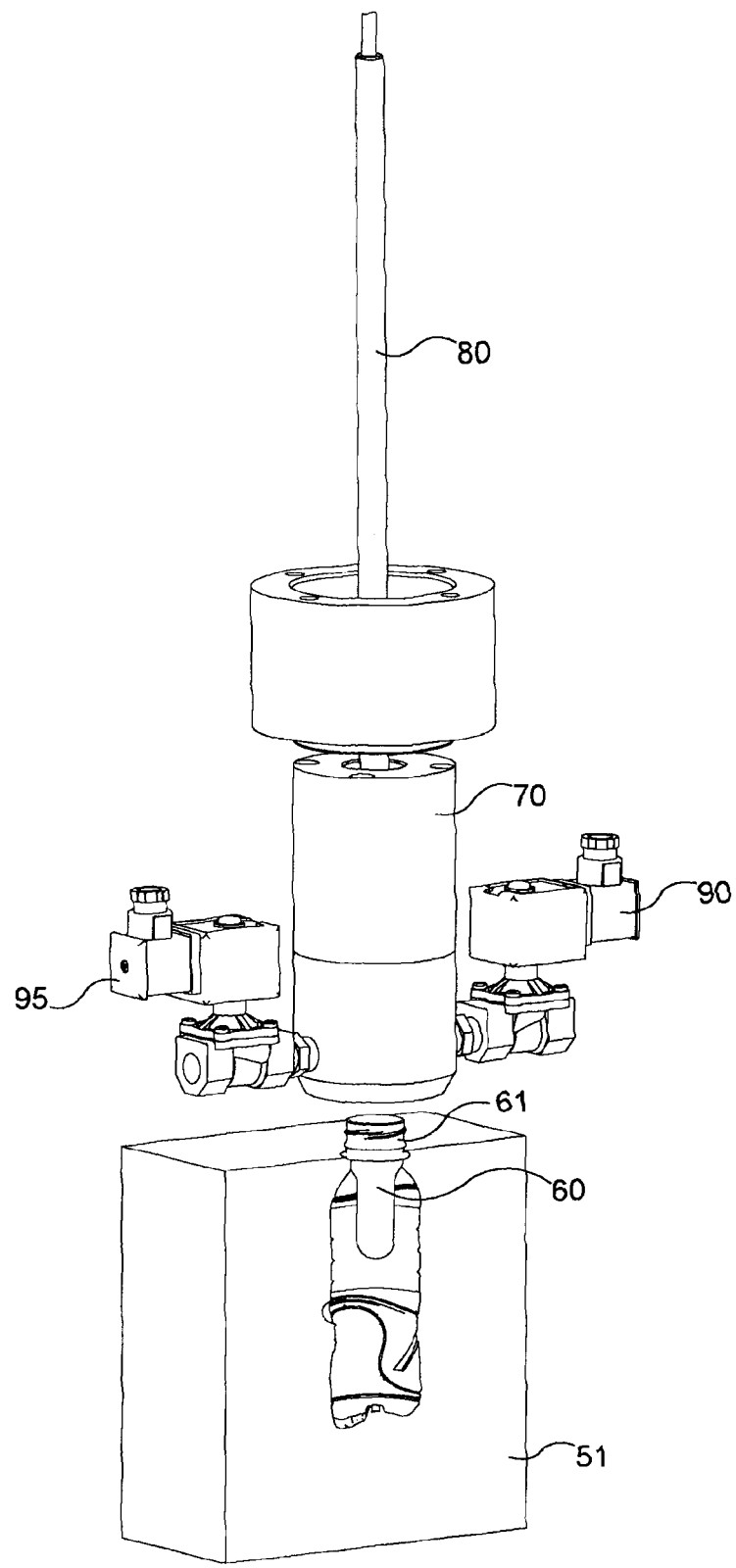
FIG. 2 shows one aspect of a beverage delivery device operating according to the invention.

FIG. 2 shows a half-mould 51, the internal wall of which defines a mineral water bottle shape. A PET preform 60 having a throat 61 defining a neck, the outside of which has a screw thread for fitting a closure cap, is positioned in the top part of the mould, which neck emerges on the outside of said mould. The opening of the preform is directed towards the outside of the mould and its axis is superposed on that of the cavity of the semi-mould.

In the use phase, a second half-mould is added to the first half-mould so as to form a complete mould, the central cavity of which may also have a general symmetry of revolution, or may have another shape, depending on the desired geometry of the container.

Above the mould is a generally cylindrical filling nozzle 70, the axis of which is positioned along the extension of the axis of the mould cavity, said filling nozzle having an actuator through the centre of which a stretch rod 80 passes, said stretch rod also being positioned along the extension of the preform axis and the mould axis.

On either side of the central actuator there are two nozzles 90 and 95 for supplying liquid or gaseous fluids into the actuator above the neck of the preform 61, said neck being positioned in the upper opening of the mould 51.

The left-hand nozzle 95 is intended for supplying the beverage, here mineral water.

The right-hand nozzle 90 is intended for supplying the sterilizing fluid, which in the first embodiment in question is steam.

Figure 3:
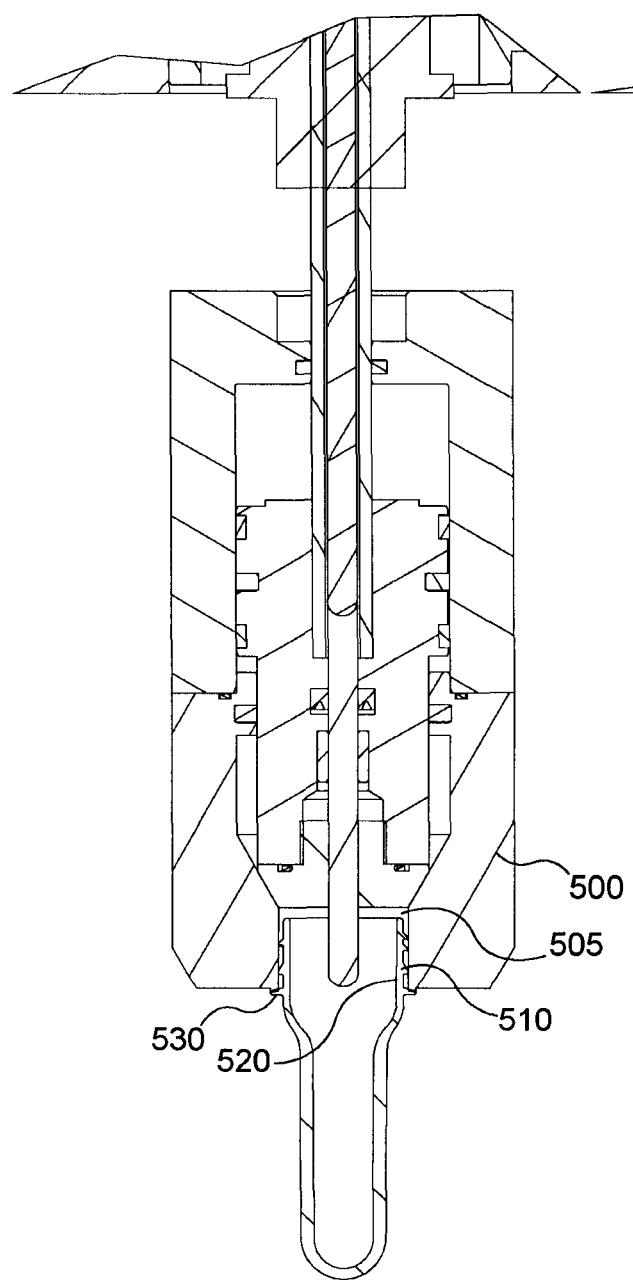
FIG. 3 shows a second aspect of a beverage delivery device operating according to the invention.
Figure 4:
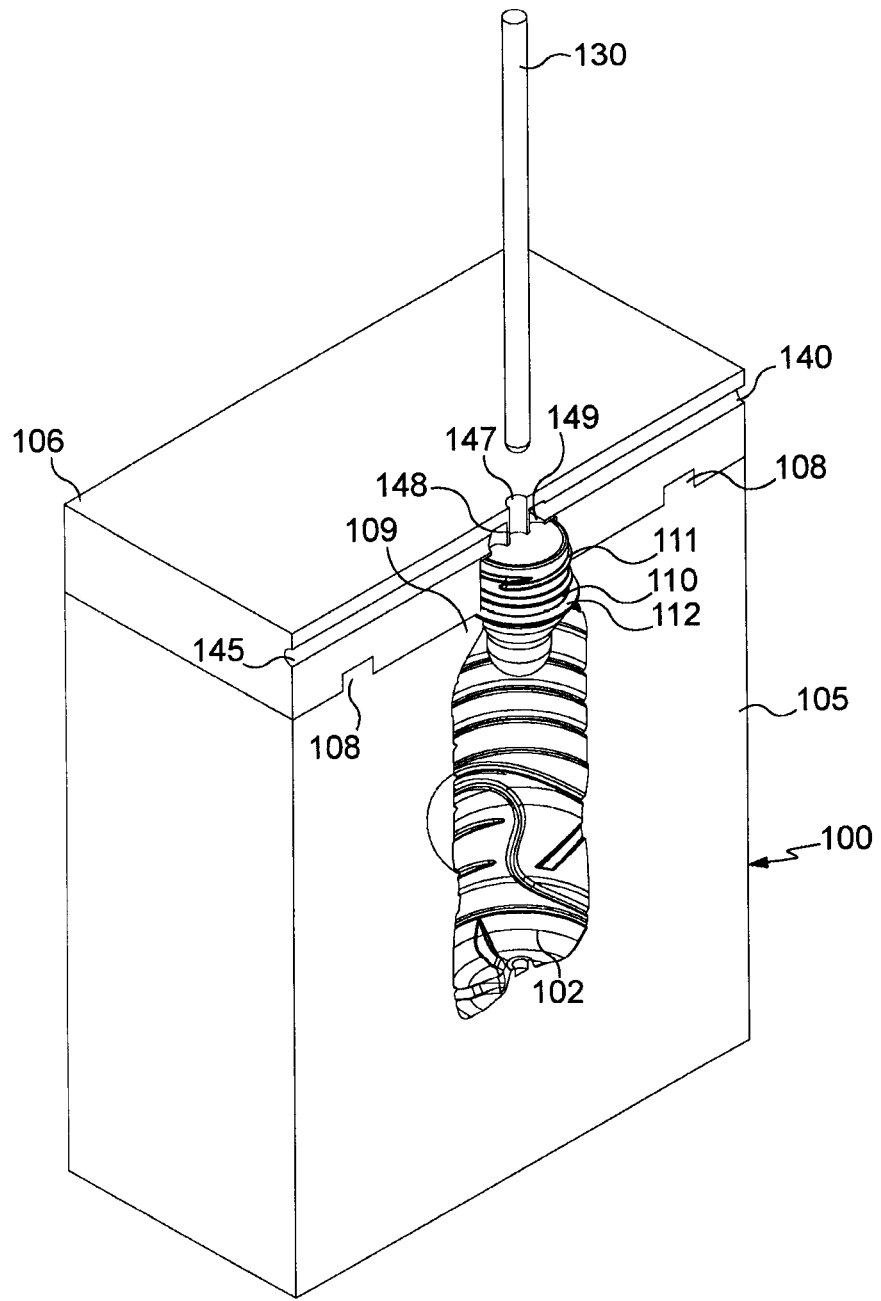
FIG. 4 illustrates an alternative embodiment of the invention.

FIG. 3 shows a bell-shaped nozzle end-piece 500 used within the context of the invention according to a preferred embodiment.

The internal and external pressures on either side of the circumference of the neck of the preform (i.e. on the external surfaces 510 of the neck and on the internal surfaces 520 of the neck) are identical, owing to the presence of a passage 505 connecting the volumes on either side of the circumference, inside the nozzle. During filling, sealing is provided by the flange 530 on the preform. Thanks to this device, there is no risk of the neck of the preform deforming while a pressurized fluid is being injected by the nozzle.

According to another embodiment, a nozzle end-piece holds the external surfaces 510 of the neck of the preform in such a way that when a pressurized fluid is injected via the top of the nozzle into the recess of the preform, the pressure exerted on the internal walls 520 of the neck of the preform by the fluid is compensated for by the holding by the walls of the bell-shaped nozzle end-piece. The neck of the preform therefore does not deform, despite the high pressure.

FIG. 2 shows a half-mould 100, a PET preform 110 being positioned in the top part of the cavity of the half-mould, which has a cylindrical general shape, with a bottom 102 in the lower part. A second half-mould (not shown) completes the mould and immobilizes the preform in the closed cavity formed by the cavities of the two half-moulds, the closed cavity defining the beverage bottle shape.

It should be noted that the half-mould 100 comprises a bottom part 105 and a top part 106, the top part 106 being fixed to the bottom part via two rails 108 forming protuberances on the upper face of the top part 106, the two rails being parallel to each other, on either side of the cavity of the mould, perpendicular to the plane of section. The cavity of the mould is mainly contained in the bottom part of the mould.

The preform 110 includes an already formed neck 111, having an external screw thread for receiving a stopper. The neck 111 is positioned in a narrowing 109 of the cavity of the half-mould, designed to immobilize it, while still being complementary to the shape of the final bottle. It should be noted that this narrowing 109 is just below the upper face of the bottom part of the mould and that the neck is thus in contact both with the top part 106 of the mould and with its bottom part 105. The screw thread of the neck is in contact with the wall of a generally cylindrical cavity of the top part 106 of the mould. The neck also has a flange 112 positioned exactly at the interface between the top part 106 and the bottom part 105 of the mould.

In the extension of the neck, in the direction of the bottom 102 of the cavity, the preform has a recess (masked in the figure), terminating in a bottom.

The internal surface of the cavity of the mould is structured so as to define the external structure of a beverage bottle, herein mineral water bottle. This structure includes circular grooves, some of which have a structural or functional role so as for example to allow a user to grip the bottle or to provide flexibility during use, or for the purpose of removing the bottle after use.

The mould includes, in its top part, two straight ducts 140 and 145 of circular cross section, one along the extension of the other, perpendicular to the axis of the cavity of the mould, corresponding to the axis of the bottle once formed. The two ducts are placed on either side of the top of the neck of the preform and are open at the top of said neck in such a way that a liquid injected into one or other of these ducts runs into the neck of the preform. It should be noted that the two ducts are in the plane of section of the mould and are therefore formed by the joining of the half-mould shown with the complementary half-mould.

A stretch rod 130 is positioned in the upper part of the figure, along the extension of the preform axis and of the mould recess. A cylindrical opening 147 in the top part of the mould, having its axis aligned with the preform axis, enables the stretch rod 130 to be inserted into the mould and into the recess of the preform, up to the point where the end of the rod comes into contact with the bottom of the recess, in order to stretch the preform.

It should be noted that above the neck the mould has two spouts 148 and 149 at the outlet of the ducts 145 and 140, enabling the fluid injected via the respective ducts 145 and 140 to be oriented towards the inside of the preform through its neck, thus causing the fluid to turn through 90°. The two spouts 148 and 149 also separate the inside of the ducts from the inside of the cylindrical opening 147.

In this second embodiment, the sterilizing fluid in question is hydrogen peroxide $H_2O_2$. It could also be another peroxide.

A stretch rod 130 is positioned in the upper part of the figure, along the extension axis of the preform and of the axis of the mould recess. A cylindrical opening in the upper part of the mould allows the stretch rod 130 to be introduced into the mould and into the recess of the preform, up to the point where the end of the rod comes into contact with the bottom of the recess, in order to stretch the preform.

In a third embodiment (not shown), the sterilizing fluid in question is peracetic acid $CH_3CO_3H$.

Of course, the invention is not limited to the embodiments described and illustrated by the appended drawings; rather it extends to all variants that can be envisaged by a person skilled in the art within the scope of the claims.

The invention claimed is:

1. Method of delivering a predetermined volume of a beverage into a thermoplastic container formed from a preform positioned in a mold having an opening opposite an injection head, said injection head being moved by a slide of an actuator to connect the injection head to the neck of the preform, comprising the steps of:

exposing the preform to a sterilizing fluid while the injection head is opposite the neck of the preform, by supplying the sterilizing fluid by a first circuit connected to the injection head, by conveying the sterilizing fluid into a liquid supply chamber of the actuator; and injecting, into a recess of the preform, at least some of the beverage supplied by a second circuit connected to the injection head, through the liquid supply chamber, so as to promote expansion of the preform inside the mold, the mold defining the shape of the container.

2. The method according to claim 1, wherein the exposure step comprises exposure to pressurized steam.

3. The method according to claim 1, wherein the exposure comprises exposure to peracetic acid.

4. The method according to claim 1, wherein the exposure comprises exposure to hydrogen peroxide.

5. The method according to claim 1, wherein the exposure comprises exposure to at least a portion of the beverage that is preheated.

6. The method according to claim 1 comprising the step of irradiating the preform with sterilizing radiation.

7. The method according to claim 6, wherein the irradiating step comprises irradiating the preform with X-rays.

8. The method according to claim 6, wherein the irradiating step comprises irradiation of the preform with microwaves.

9. The method according to claim 6, wherein the irradiating step comprises irradiation with an electron beam or with pulsed light.

10. The method according to claim 1 comprising a prior step of exposing the injection head to the sterilizing fluid.

11. The method according to claim 1 comprising a prior step of exposing a stretch rod to the sterilizing fluid, the stretch rod being used during the injection step to longitudinally stretch the preform.

12. The method according to claim 1 comprising a prior step of at least partly sterilizing the preform before the preform is introduced into the mold.

13. The method according to claim 1 comprising the step of removing debris from the mold after the preform has been expanded.

14. The method according to claim 1, wherein the first and second circuits are separate, distinct, and merge with the liquid supply chamber on opposite sides of the actuator relative to each other.

15. The method according to claim 1, wherein the step of exposing the preform to a sterilizing fluid includes increasing the temperature of the preform.

16. The method according to claim 15, wherein the increase in the temperature of the preform is sufficient to promote expansion of the preform inside the mold during the injection step.

17. The method according to claim 11, comprising sliding a piston wall in a direction parallel to the stretch rod, wherein the piston wall is between a first chamber and a second chamber of the actuator that are filled with compressed air, the stretch rod inserting through a cylinder in the actuator, the cylinder extending from the piston wall through the second chamber and the liquid supply chamber.

18. The method according to claim 17, wherein the first, second and liquid supply chambers of the actuator are vertically aligned, and the second chamber is between the first chamber and the liquid supply chamber.

19. Method of delivering a predetermined volume of a beverage into a thermoplastic container formed from a preform positioned in a mold having an opening opposite an injection head, comprising the steps of:

injecting, into a recess of the preform, at least some of the beverage supplied by a circuit connected to the injection head through a liquid supply chamber of an actuator, so as to promote expansion of the preform inside the mold, the mold defining the shape of the container; and sliding the injection head by a slide of the actuator to connect the injection head to the neck of the preform, wherein said injecting comprises circulating the beverage between the liquid supply chamber and the inside of the injection head through a lateral opening between the injection head and the liquid supply chamber.

20. The method according to claim 19, comprising exposing the preform to a sterilizing fluid supplied into said liquid supply chamber.

21. The method according to claim 20, comprising a prior step of exposing a stretch rod to the sterilizing fluid, the stretch rod being used during the injection step to longitudinally stretch the preform.

22. The method according to claim 21, wherein the actuator comprises a piston wall in a direction parallel to the stretch rod, the piston wall is between a first chamber and a second chamber of the actuator that are filled with compressed air, the slide of the actuator includes a cylinder and the stretch rod inserting through the cylinder, the cylinder extending from the piston wall through the second chamber and the liquid supply chamber.

* * * * *